United States Patent [19]
Warren

[11] 3,929,199
[45] Dec. 30, 1975

[54] SNOW MACHINE
[76] Inventor: Ivan Van Warren, P.O. 117, Greenleaf, Idaho 83620
[22] Filed: Sept. 26, 1974
[21] Appl. No.: 499,351

[52] U.S. Cl. ......... 180/14 R; 180/79.2 B; 280/469; 280/492
[51] Int. Cl.² ......................................... B62D 11/04
[58] Field of Search ............ 180/79.2 B, 79.4, 79.5, 180/51, 14 R; 280/463, 464, 468, 469, DIG. 9, 492

[56] References Cited
UNITED STATES PATENTS

| | | | |
|---|---|---|---|
| 2,362,262 | 11/1944 | French | 180/79.2 B |
| 2,765,862 | 10/1956 | Tucker | 180/51 |
| 3,151,694 | 10/1964 | Rogers | 180/51 |
| 3,215,219 | 11/1965 | Forsyth et al. | 180/79.2 B |
| 3,353,618 | 11/1967 | Fisher | 180/14 R |
| 3,414,072 | 12/1968 | Hodges et al. | 180/79.2 B |
| 3,446,175 | 5/1969 | Boehler et al. | 180/79.2 B |
| 3,473,619 | 10/1969 | Dion | 180/51 X |

FOREIGN PATENTS OR APPLICATIONS
1,142,293  1/1963  Germany ............................ 180/51

*Primary Examiner*—David Schonberg
*Assistant Examiner*—John A. Pekar
*Attorney, Agent, or Firm*—John W. Kraft; Charles L. Kraft, II

[57] ABSTRACT

The steering joint for articulated vehicles having a control unit and a trailing unit comprises a housing including a mounting flange having means for fastening the flange centrally in the rearwardmost terminal ends of the control unit, and a horizontal support plate issuing rearwardly from the flange; a sprocket being fastened on a vertically disposed shaft which is journally mounted to the support plate, the sprocket being provided with a roller chain connected to a suitably controlled actuator in the control unit; and a pivot plate being fastened parallel to the shaft carrying the sprocket, the pivot plate being fastened to the forwardmost terminal end of the trailing unit.

6 Claims, 7 Drawing Figures

U.S. Patent  Dec. 30, 1975  Sheet 1 of 2  3,929,199

SNOW MACHINE

FIELD OF INVENTION

The present invention relates to vehicles, and more particularly to a vehicle which is articulated and controlled at its center by a steering joint.

BACKGROUND OF INVENTION

Articulated vehicles, and more particularly articulated vehicles which are steered by actuating one portion of the vehicle with respect to another, relate to vehicles having one set of wheels or the like which may be selectively pivoted with respect to another trailing set of wheels by any of a variety of actuators. Articulated vehicles have been restricted to construction vehicles such as skip loaders and the like, which employ hydraulic rams as the pivoting actuators. Vehicles of the prior art employing pivoted centers have typically pivoted along the single, horizontal plane. Accordingly, the advantages of great maneuverability of articulated vehicles has been lost in such applications as recreational vehicles because hydraulic rams may not be adaptable to the size of the structure or the demands for durability. Further, the swivel or joint being pivoted along the single horizontal plane may result in the vehicle having one set of wheels out of contact with terrain at hills, gulches and the like. This results in a lack of power, and a lack of control.

Accordingly, it is an object of the present invention to provide a vehicle which is articulated and controlled at its center by a steering joint which is controllable along the horizontal axis for steering, and vertically along its rectilinear axis in response to changes in terrain.

It is a further corollary object of this invention that the present vehicle be adaptable as a recreational vehicle.

It is an object of the present invention that the present vehicle be adaptable to wheel or track mounted embodiments, and to engine-and-mechanical, or engine-and-hydraulic motor driven wheels.

It is a primary object of this invention that the swivel joint be provided with means for actuating the respective units, which is durable, shock-resistant and simple to service.

It is a corollary of latter object that means for actuating the steering joint not be dependent upon external power sources, such as hydraulic systems and the like, through the present system may be adaptable to said systems.

These and other objects shall become apparent from the description following, it being understood that modifications may be made without affecting the teachings of the invention here set out.

SUMMARY OF THE INVENTION

The steering joint for articulated vehicles having a control unit and a trailing unit comprises a housing, including a mounting flange having means for fastening the flange centrally in the rearwardmost terminal ends of the control unit, and a horizontal support plate issuing rearwardly from the flange; a sprocket being fastened on a vertically disposed shaft which is journally mounted to the support plate, the sprocket being provided with a roller chain connected to a suitably controlled actuator in the control unit; and a pivot plate being fastened parallel to the shaft carrying the sprocket, the pivot plate being fastened to the forwardmost terminal end of the trailing unit.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
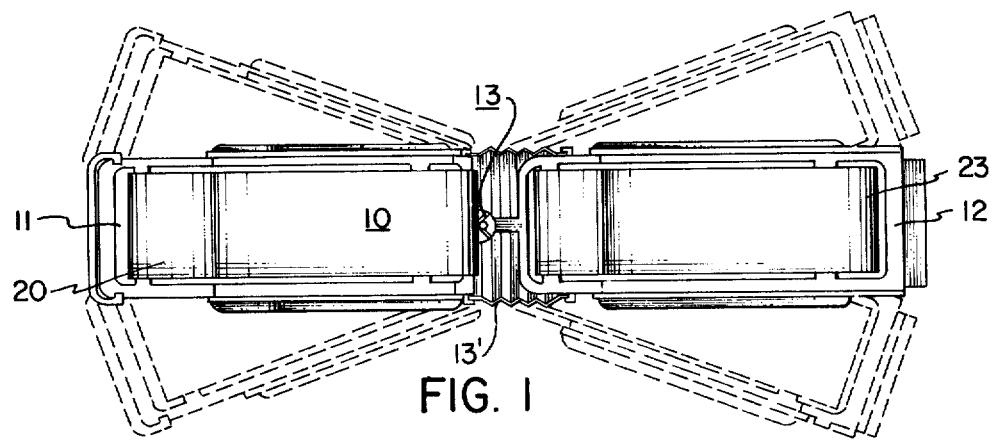
FIG. 1 is a bottom plan view of the articulated vehicle of this invention shown articulated away from its usual rectilinear axis in broken lines for illustrative purposes.
Figure 2:
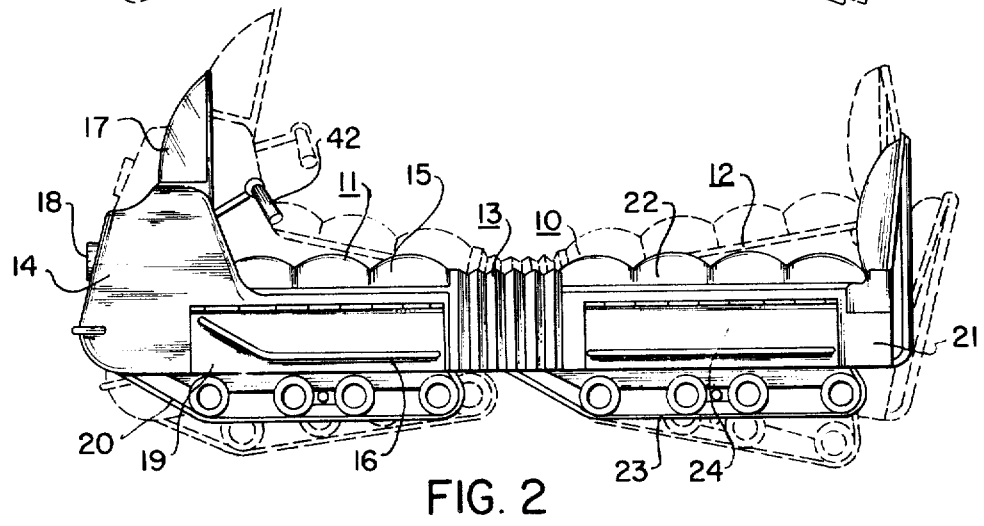
FIG. 2 is a left side elevational view of the apparatus of the FIG. 1 shown with the units thereof pivoted at the steering joint.

Referring now to the drawings and more particularly to the FIGS. 1 and 2, the articulated vehicle of this invention is shown to advantage and generally identified by the numeral 10. The vehicle 10 comprises a control unit 11, a trailing unit 12 and a steering joint 13. The control unit 11 includes a frame and body 14 having a cushioned seat 15, an engine cover 16, with windshield 17, lights 18, and the like. The control unit 11 is powered by an engine 19, which is suitably mounted in the body 14, and rides on tracks 20. The tracks 20 may be coextensive with the width of the body 14 or pairs of tracks may be used. Similarly, the trailing unit 12 includes a frame and body 21, with cushioned seats 22 and the like, and tracks 23 powered by an engine 24.

Figure 3:
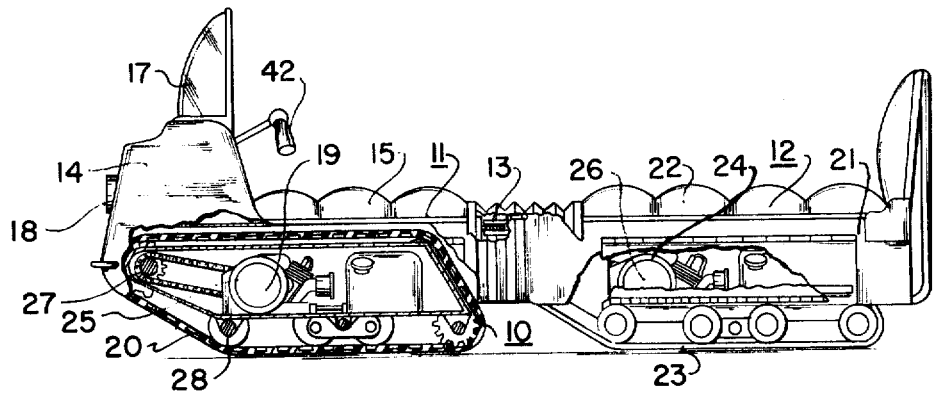
FIG. 3 is a left side elevational view of the apparatus of the FIG. 1 with walls thereof broken away to show engines and transmissions thereof.

As shown more clearly in the FIG. 3, the engines 19 and 24 are mounted in their respective bodies 14 and 21 under the cushions 15 and 22, respectively. Other arrangements, of engines 19 and 24 in the frames and bodies 14 and 21, may be used to similar advantage with concomitant changes in the center of gravity of the vehicle 10. In the manner of other track vehicles, the tracks 20 and 23 of the present vehicle 10 are connected to the engines 19 and 24 by synchronously controlled transmissions 25 and 26, respectively, to sprockets 27 and idling rollers 28 mounting the tracks.

Figure 4:
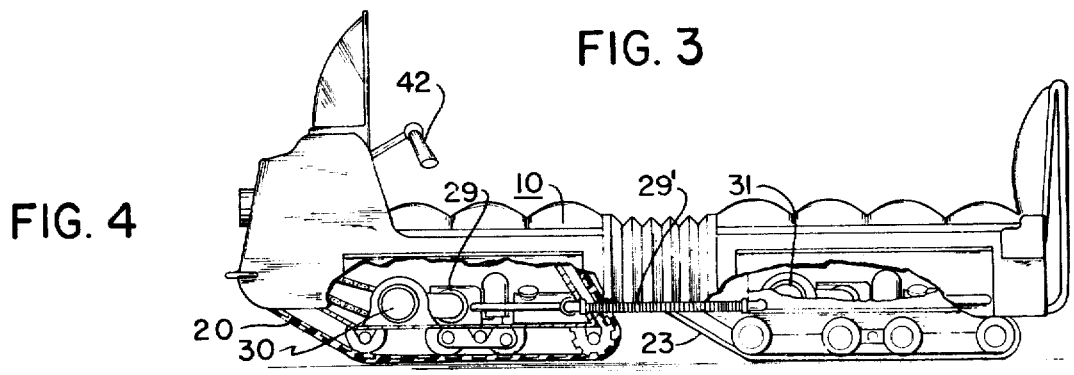
FIG. 4 is a left side elevational view of a further embodiment of the apparatus of the FIG. 2 employing a hydraulic power systems.
Figure 5:
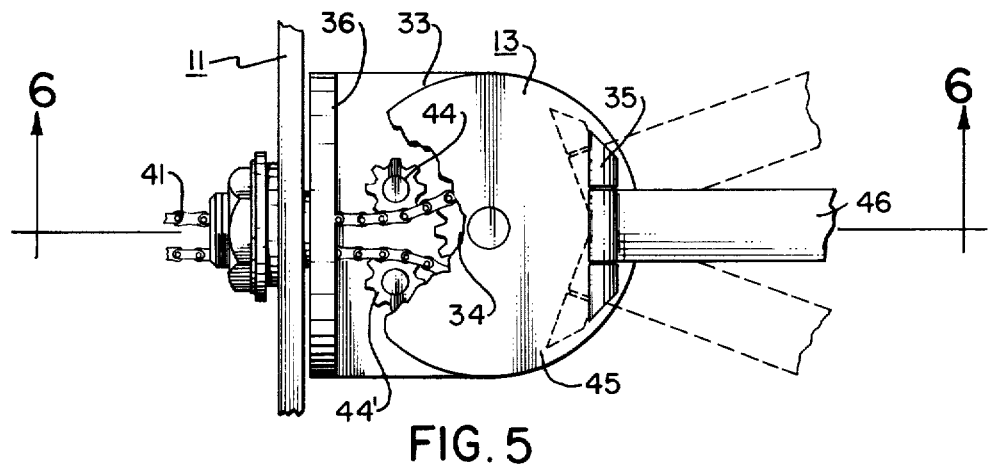
FIG. 5 is a top plan view of the steering joint of this invention.
Figure 6:
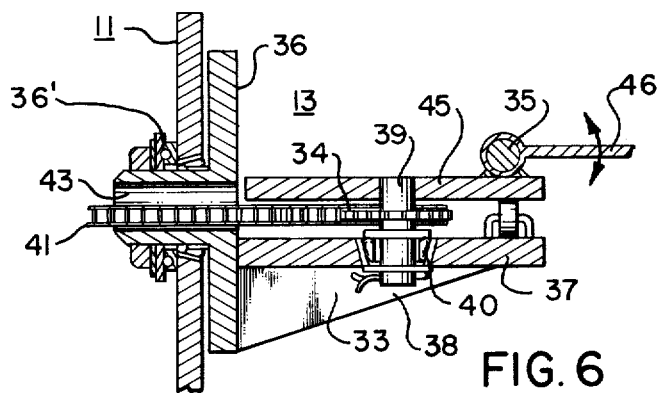
FIG. 6 is a cross-sectional view taken substantially along the lines 6—6 of the FIG. 5.
Figure 7:
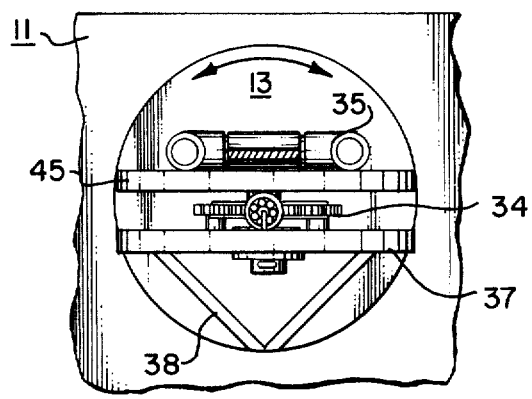
FIG. 7 is a rear end view of the steering joint of this invention.

As shown in the FIG. 4, a further embodiment of the vehicle 10 is adapted to employ a single engine having a hydraulic pump 29 and hydraulic motors 30 and 21 which drive the tracks 20 and 23, respectively. The rearward motor 31 is connected to the pump 29 by a flexible conduit 29'. Referring again to the FIGS. 1 and 2, the steering joint 13 is operable to pivotally join and control the units 11 and 12, and to permit the units 11 and 12 to pivot along the vertical axis to insure that both of the tracks 20 and 23 are on the ground. The joint 13 may be provided with an accordion cover 13' to protect the joint 13 from water and debris. As shown in the FIGS. 5, 6 and 7, the steering joint 13 comprises a housing 33, a pivot sprocket 34, and a longitudinal hinge 35. The housing 33 includes a rotaable mounting flange 36 by which the steering joint 13 is fastened centrally in the rearwardmost terminal end of the control unit 11, a horizontal support plate 37 issuing rearwardly from the flange 36. The flange 36 is journally mounted in the end of the unit on a bearing 36' to provide axial pivot, should the units 11 and 12 be at differing lateral planes (as shown by the vector in FIG. 7). The support plate 37 may be braced on its lowermost terminal side by a diagonal web 39 which joins the flange 36. The sprocket 34 is mounted on a journalled, vertically disposed shaft 39 which is fastened in a bearing 40 provided in the support plate 37. The sprocket 34 has a roller chain 41, which is connected to arms (not shown) of the handlebars 42 at the forward end of the control unit 11. At the sprocket, 34 the chain 41 is threaded through a hole 43, which is disposed centrally through the flange 36. To accomplish this pattern and to facilitate leverage on the sprocket 34, the chain 41 is threaded between idling sprockets 44 and 44', which are journally mounted in the support plate 37, and which are disposed with their respective interior curvatures at a distance which is nominally less than the diameter of the hole 43. By this means, the chain 41 issues parallelly through the hole 43, while following the wider diameter of the sprocket 34. A pivot plate 45 is fastened at the uppermost terminal end of the shaft 39.

The trailing unit 12 is connected to the steering joint 13 by the longitudinal hinge 35, which is operable to permit the units 11 and 12 to pivot vertically along the rectilinear axis of the vehicle 10. The longitudinal hinge 35 includes a pair of substantially parallelly disposed leaves 46, which are mounted between the rearwardmost terminal end of pivot plate 45 and the forwardmost terminal end of the trailing unit body 21.

In operation, the vehicle 10 may be accelerated and decelerated in the manner of track-mounted vehicles. It is clear that the present invention may be adapted to an all-wheel construction, wherein the wheels are substituted for the respective tracks. Turning is accomplished by articulation of the vehicle 10 at the joint 13 by applying pressure on the handle bars 42 causing the chain 41 to rotate the sprocket 34 and the pivot plate 45 as shown in the FIG. 1. As shown in the FIG. 2, the vehicle 10 may pivot at its center in response to changes in terrain by means of the hinge 35, as set out above.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention is limited only to the extent indicated in the appended claims.

I claim:

1. A steering joint for articulated vehicles having a control unit and a trailing unit comprising:
    a housing including a mounting flange having means for fastening said flange centrally in the rearwardmost terminal end of said control unit, and a horizontal support plate issuing rearwardly from said flange;
    a sprocket being fastened on a vertically disposed shaft which is journally mounted to said support plate, said sprocket being provided with a roller chain connected to a suitably controlled actuator in said control unit;
    a pivot plate being fastened perpendicularly to said shaft carrying said sprocket, said pivot plate being fastened to the forwardmost terminal end of said trailing unit; and
    said chain issues through a hole in said mounting flange and about said sprocket, said chain being held in parallel alignment through said hole by a pair of sprockets journally mounted to said support plate adjacent said hole.

2. The apparatus of claim 1 wherein said pivot plate and said trailing unit are connected by a hinge having a leaf which is mounted for vertical pivoting.

3. The apparatus of claim 1 wherein said vehicle is a recreational vehicle having an engine and transmission in said control unit for driving said vehicle.

4. The apparatus of claim 1 wherein said vehicle is a recreational vehicle having an engine in said trailing unit for driving said vehicle.

5. The apparatus of claim 1 wherein said vehicle is a recreational vehicle having an engine in said control unit and said trailing unit for driving said vehicle.

6. The apparatus of claim 1 wherein said vehicle has a single engine, an hydraulic pump, and hydraulic motors driving wheels in said control unit and said trailing unit.

* * * * *